Figure 1:
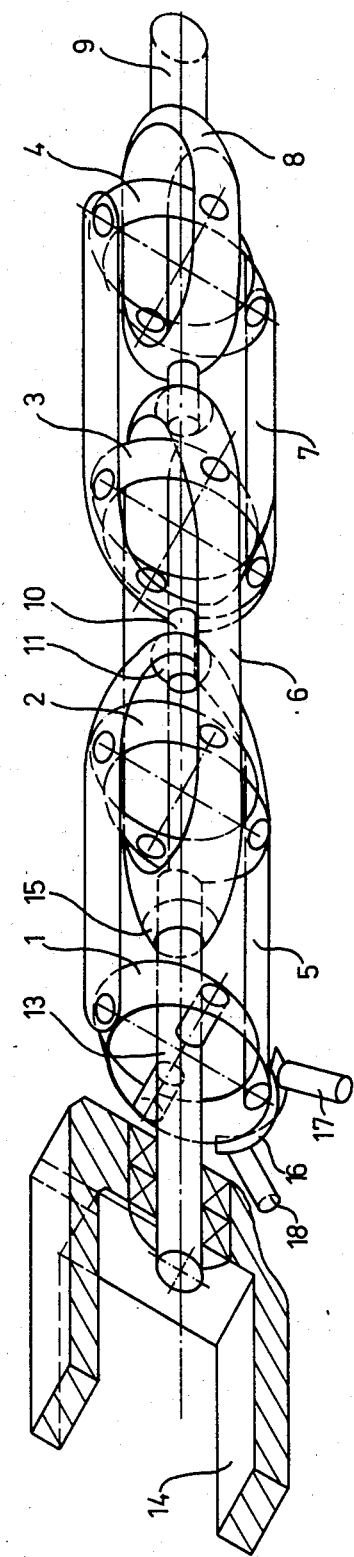

United States Patent [19]

Molaug

[11] Patent Number: 4,696,659
[45] Date of Patent: Sep. 29, 1987

[54] SWIVEL-JOINTED ROBOT ARM

[76] Inventor: Ole Molaug, Jernbanegaten 4, N-4340, Byrne, Norway

[21] Appl. No.: 812,785

[22] Filed: Dec. 23, 1985

Related U.S. Application Data

[63] Continuation of Ser. No. 532,449, Sep. 15, 1983, abandoned.

[30] Foreign Application Priority Data

Sep. 28, 1982 [NO] Norway ................................. 823260

[51] Int. Cl.$^4$ ............................ F16C 1/04; B25J 17/00
[52] U.S. Cl. ..................................... 464/148; 464/179; 901/28
[58] Field of Search ....................... 901/27, 28, 21–22, 901/29; 414/4, 7; 403/59, 76, 122, 131, 61, 151, 128, 135; 464/179, 148, 106

[56] References Cited

U.S. PATENT DOCUMENTS

| 4,107,948 | 8/1978 | Molaug | 464/179 X |
| 4,154,544 | 5/1979 | Gair | 403/59 |
| 4,511,305 | 4/1985 | Kawai et al. | 901/29 X |

FOREIGN PATENT DOCUMENTS 2378612 9/1978 France ................................. 901/43

Primary Examiner—Joseph J. Rolla
Assistant Examiner—Nils Pedersen
Attorney, Agent, or Firm—Paul L. Sjoquist

[57] ABSTRACT

A swivel-jointed robot arm consisting of a plurality of interconnected, rigid links (5,6,7,8) linked together in the fashion of chain links, wherein the links (5,7) are joined to the same intermediate link (6) and adjacent, abutting ends of the links (5,7) are mutually pivotally connected; whereas the flexible robot arm's innermost end link (5) is pivotally supported (1) in relation to a preceding robot arm member (14) having a protruding drive shaft (13) for turning the jointed robot arm about its own axis, and is arranged to be driven by a drive means (16,17,18) in controlled outward swinging movements about said pivotal support (1), while at the same time the inner end of the next successive link (6), which is joined to said end link (5), is pivotally connected to the drive shaft (13) for transmitting a corresponding outward swinging motion to the following links (7,8). The pivotal connection between the mutually abutting ends of two links (5,7 and 6,8 respectively) constitutes a pin (10) fixedly attached to one end of one link (7 and 8 respectively), which passes within a hole in a ball (11) that is movably mounted in a bearing (12) attached to the adjacent end of an abutting link (5 and 6 respectively). The pivotal connection between the drive shaft (13) and the next successive link (6) is established in the same manner.

1 Claim, 3 Drawing Figures

SWIVEL-JOINTED ROBOT ARM

This is a continuation of abandoned U.S. application Ser. No. 532,449, filed Sept. 15, 1983.

The present invention relates to a swivel-jointed robot arm. On industrial robots, it is often desirable to be able to orient a tool attached to the end of the robot arm in a variety of positions. For this reason, robots wherein the outermost member of the robot arm is swivel-jointed are known in the prior art.

A swivel-jointed robot arm comprises a joint which is pivotable about two orthogonal axes simultaneously, and which in addition is pivotable about a third axis. Typically, the joint can be moved 180 degrees in all directions in relation to the axis of the robot arm by combining a rotation about said orthogonal axes. Typically, also, the joint can rotate about the axis of the robot arm no matter what the position of the joint. A well known joint having these properties is the universal joint. A universal joint of the conventional type has a restricted work area. To obtain a larger work area, it is possible to assemble several universal joints in such a way that the sum of the work areas for the respective universal joints provides the desired function. See Norwegian Patent No. 137,351, which describes an assembly of several universal joints to provide a swiveling, pivotable robot arm.

A characteristic feature of the robot arm described in the above-referenced patent specification is that the cumulative effect of the movements of the universal joints is obtained through the interaction of spherical surfaces or other curved surfaces that roll or tip toward each other. On this type of flexing robot arm, it is necessary to ensure that the curved surfaces do not slide against each other and that they do not disengage. This is obtained according to the patent specification by providing the curved surfaces with meshing grooves and ridges or with mating pins and holes. Practical embodiments have demonstrated that the groove-and-ridge solution is usable only for very small movements in each joint, and many joints are therefore necessary to make an arm that can be moved 180 degrees. One of the characteristics of a good robot arm is that there is very little play in the transitions between joints, where motion is transferred. To reduce play, it is desirable to have as few joints as possible, because the total amount of play is the sum of the play in each joint. The use of engaging pins and holes has found wider application because it enables larger movements per joint. An embodiment having pins and holes of involuted configuration has been used. The transfer of motion in this embodiment works in the same way as two spherical gears which can roll against each other in all directions. This construction, however, has several drawbacks. It is the intention of the present invention to improve upon a robot arm of this type; therefore, the drawbacks of this embodiment will be described in more detail below.

A high degree of precision is required of the surfaces in contact with each other in order to avoid play or jerking movements. The prior art construction is very sensitive to any axial displacement between the joints. An axial displacement has the same effect as changing the distance between the shafts of two meshing gears. For there to be no play in the joints, therefore, great accuracy is required in regard to the center-to-center distances and the assembly of each joint. It is usually necessary to adjust this during assembly and installation of the device. One drawback of this embodiment is that the surface of contact between each joint becomes very small, because a circular tooth is meshing with a larger-diameter hole. A small surface of contact results in increased wear. Mechanical limitations make it impossible to have more than one tooth in full engagement at the outer positions. The dimension of the meshing tooth determines the loading the construction can withstand, with respect to flexural stresses, shear stresses and especially material fatigue.

It is the object of the present invention to provide a flexible robot arm which is assembled in a manner known per se by interconnecting several universal joints, but wherein the connection between each joint has a relatively large surface of contact and is therefore more resistant to wear; wherein the supporting strength of the connection is substantially greater than on any known robot arm of similar dimensions; which does not require an inordinate degree of precision with respect to axial displacements or precision of assembly; and wherein every joint moves with a smooth and steady motion.

This object is achieved according to the invention by means of the features recited in the appurtenant patent claims.

Figure 2:
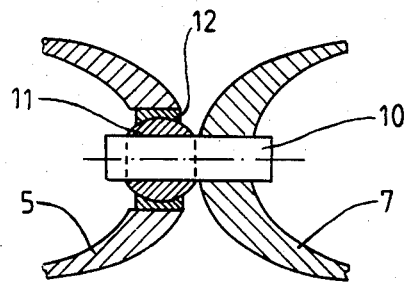
Figure 3:
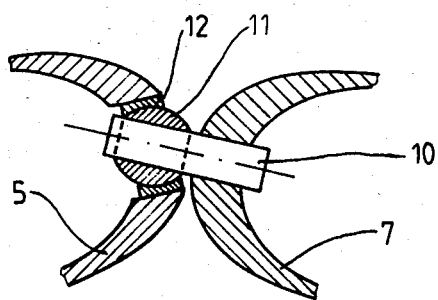

The accompanying drawings schematically illustrate an exemplary embodiment of the invention, wherein:

FIG. 1 shows a swivel-jointed robot arm according to the invention, in perspective view, FIG. 2 shows a longitudinal section through the end coupling of two joints in the flexible robot arm when the joints are in alignment, and FIG. 3 shows a longitudinal section through the end coupling of two joints of the flexible robot arm when the joints are moved with respect to each other.

The robot arm in FIG. 1 comprises four universal joints 1,2,3,4. The universal joints 1,2,3,4 are interconnected by means of, respectively, a first link 5, a second link 6, a third link 7 and a fourth link 8 which are interlinked almost in the fashion of chain links but with the universal joints interposed therebetween, the links in fact constituting a part of the universal joints. Attached to the outer end of the outermost link 8 is a shaft stump 9 for fastening tools to the flexible robot arm. Thus far, the flexible robot arm of the invention is constructed in the same way as the arm described in Norwegian Patent No. 137,351. The robot arm of the present invention differs from the robot arm described in said specification by the manner in which movement is transmitted from one joint to the next. Movement is transmitted from the first link 5, for example, to the adjacent third link 7, in that the third link 7 is formed with a pin 10 that slidably fits within a hole in a ball 11, which is movably mounted in a bearing 12 attached to the first link 5. When the links 5,7 are moved relative to one another, the pin 10 slides axially within the hole in the movable ball 11 while the ball 11 simultaneously turns, as shown in FIG. 3. The surface of contact between the two links 5 and 7 thus constitutes the surface of contact between the pin 10 and the movable ball 11. Since the pin 10 is supposed to slide axially relative to the hole in the ball 11 when the links 5,7 are moved, no particular axial precision is required during assembly of the device. Because there is only one pin 10 in engagement and the pin 10 never becomes disengaged, jerky movement is prevented (which otherwise easily results when the point of engagement passes from one pin to the next). The movable ball 11 is a link bearing of conventional type. Such highprecision bearings are available at low cost. The surfaces which are essential for good functioning of the assembly can thus be produced at a standard lathe with conventional tools. The production costs are therefore low in comparison with embodiments wherein the motion is transmitted between the links 5,7 by means of curved surfaces which roll or tip toward each other.

A rotary shaft 13 extends from the preceding robot arm member 14 through a hole in a ball 15 which is movably mounted in a bearing fastened to the rearward end of the second link 6, in the same manner as described previously.

A drive ring 16 is in sliding contact with the exterior of the first universal joint 1, and two pins 17 and 18 are attached to the drive ring, adapted to be connected to respective, longitudinally movable rods (not illustrated), which are attached to the preceding robot arm member 14 for flexing the swivel-jointed robot arm.

I claim:

1. A swivel-jointed robot arm adapted to be driven in controlled flexing and rotational movements by a robot drive means including a rotatable shaft projecting forwardly along a robot drive axis, comprising a plurality of interconnected rigid links wherein successive links are linked together in the fashion of chain links and are mutually pivotally connected by universal joints disposed between the interlinking ends of the links, wherein two adjacent links are joined to the same intermediate link and have respective link ends in abutting relationship, and wherein the rearwardmost link end is joined to the forwardly projecting rotatable shaft, and wherein the forwardmost link end is joined to a tool-coupling shaft, the respective links further comprising the intermediate link having a rearwardly facing link end having an opening with a spherical bearing affixed therein and a ball rotatable in said bearing, said ball having a hole therethrough sized to slidably accept said drive means forwardly projecting rotatable shaft to permit unrestrained movement of said link end along said robot drive axis and also having a forwardly facing link end having an opening with a spherical bearing affixed therein and a ball rotatable in said bearing, said ball having a hole therethrough; the rewardmost of the two adjacent links having a forrwardly facing link end having an opening with a spherical bearing affixed therein and a ball rotatable in said bearing, said ball having a hole therethrough; the forwardmost of the two adjacent links having a rearward facing link end having a pin affixed thereto, said pin slidably engaging the hole in the ball in the forwardly facing link end of said rewardmost adjacent link; and a further front link joined to the too-coupling shaft, said further front link having a rearward facing link end having a pin affixed thereto, said pin slidably engaging the hole in the ball in the forwardly facing link end of said intermediate link.

* * * * *